US010857907B2

(12) United States Patent
Brodersen et al.

(10) Patent No.: US 10,857,907 B2
(45) Date of Patent: Dec. 8, 2020

(54) IN-CUSHION SEAT SWIVEL

(71) Applicant: Sears Manufacturing Co., Davenport, IA (US)

(72) Inventors: Cole Thomas Brodersen, Davenport, IA (US); John Riedel, Davenport, IA (US); Daniel Joseph Alexander, Davenport, IA (US); Wayne David Ward, Bettendorf, IA (US); Deane Wichelt, Blue Grass, IA (US); Dale R. Ropp, Buda, IL (US); Thomas R. Hartwig, Long Grove, IA (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 15/946,258

(22) Filed: Apr. 5, 2018

(65) Prior Publication Data

US 2019/0308525 A1 Oct. 10, 2019

(51) Int. Cl.
*B60N 2/30* (2006.01)
*A47C 3/18* (2006.01)
*B60N 2/02* (2006.01)
*B60N 2/68* (2006.01)

(52) U.S. Cl.
CPC .................. *B60N 2/02* (2013.01); *A47C 3/18* (2013.01); *B60N 2/3052* (2013.01); *B60N 2/686* (2013.01)

(58) Field of Classification Search
CPC ................ B60N 2/0742; B60N 2/3052; B60N 2002/022; A47C 3/18
See application file for complete search history.

(56) References Cited

U.S. PATENT DOCUMENTS

| | | | | |
|---|---|---|---|---|
| 1,747,543 A * | 2/1930 | Gregory | A47C 3/18 | 297/263.2 |
| 3,438,606 A * | 4/1969 | Rubin | A47C 3/18 | 108/150 |
| 3,570,800 A | 3/1971 | Cycowicz | | |
| 3,718,365 A * | 2/1973 | Gibson | A47C 9/10 | 114/363 |
| 4,034,947 A | 7/1977 | Geisel | | |
| 4,097,016 A * | 6/1978 | Petrucci | A47C 3/18 | 108/142 |
| 4,173,370 A | 11/1979 | Dillard | | |
| 4,792,188 A | 12/1988 | Kawashima | | |

(Continued)

FOREIGN PATENT DOCUMENTS

| | | | |
|---|---|---|---|
| DE | 102014107816 A1 * | 12/2015 | B60N 2/146 |
| DE | 102014107816 B4 * | 5/2018 | |
| EP | 3033971 B1 * | 5/2018 | A47C 3/18 |

*Primary Examiner* — Timothy J Brindley
(74) *Attorney, Agent, or Firm* — Lane & Waterman LLP

(57) ABSTRACT

A pivoting seat for a vehicle comprises a seat frame mountable to the vehicle, the seat frame including a pivot mount and a plurality of roller assemblies. A seat cushion assembly includes a seat cushion and a seat pan assembly supporting the seat cushion that is pivotably mounted to the pivot mount so that the seat cushion assembly is pivotable relative to the seat frame. The seat pan assembly includes a flat perimeter plate at an outer perimeter of the seat pan assembly, wherein each of the plurality of roller assemblies is arranged to contact the flat perimeter plate to support the seat cushion assembly while permitting pivoting of the seat cushion assembly relative to the seat frame.

13 Claims, 6 Drawing Sheets

12

11

20

(56) References Cited

U.S. PATENT DOCUMENTS

| | | | | |
|---|---|---|---|---|
| 5,318,339 | A | 6/1994 | Cherniak | |
| 5,390,978 | A | 2/1995 | Janisch | |
| 5,427,426 | A | 6/1995 | Grappo | |
| 5,441,329 | A | 8/1995 | Janisch | |
| 5,482,354 | A | 1/1996 | Gryp | |
| 5,762,398 | A | 6/1998 | Gonzalez et al. | |
| 5,779,309 | A * | 7/1998 | Lu | A47C 3/18 248/349.1 |
| 6,015,188 | A | 1/2000 | Yundt et al. | |
| 7,204,554 | B2 | 4/2007 | Wieclawski | |
| 8,056,980 | B2 | 11/2011 | Koutsky et al. | |
| 9,415,702 | B2 * | 8/2016 | Auger | B60N 2/062 |
| 9,707,865 | B1 | 7/2017 | Buerkle | |
| 10,092,112 | B1 * | 10/2018 | Waszak | A47D 1/00 |
| 2007/0284905 | A1 | 12/2007 | Bailey | |
| 2009/0101786 | A1 * | 4/2009 | Faull | A47C 3/18 248/425 |
| 2011/0278418 | A1 * | 11/2011 | Kuo | A47C 3/18 248/425 |
| 2014/0028069 | A1 * | 1/2014 | Weiss | A47C 3/18 297/344.21 |
| 2016/0039315 | A1 * | 2/2016 | Haller | B60N 2/146 297/270.1 |

* cited by examiner 74
62
63
25
76
66
60
64
77
77
76

68
60a
60
62
63
60b
73
60b
67
66
78
72

76
76
60c

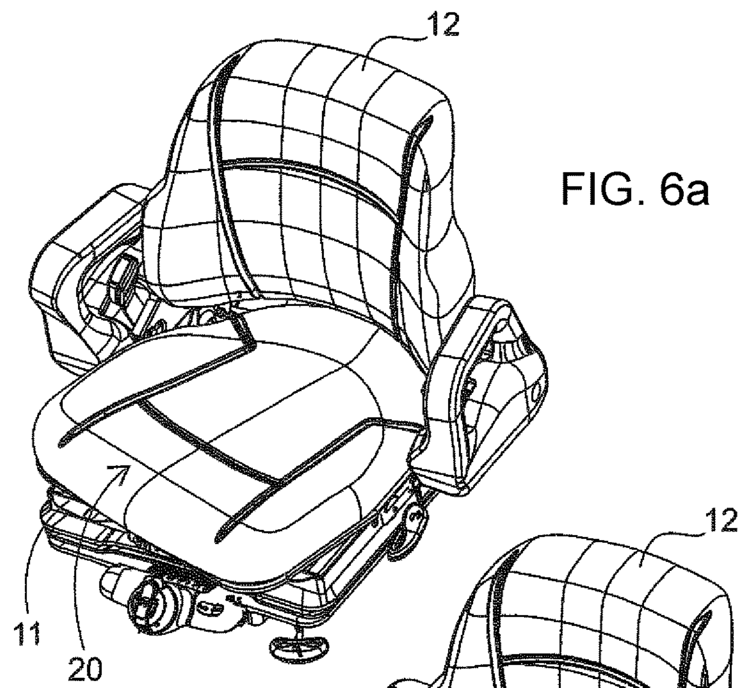
FIG. 6a
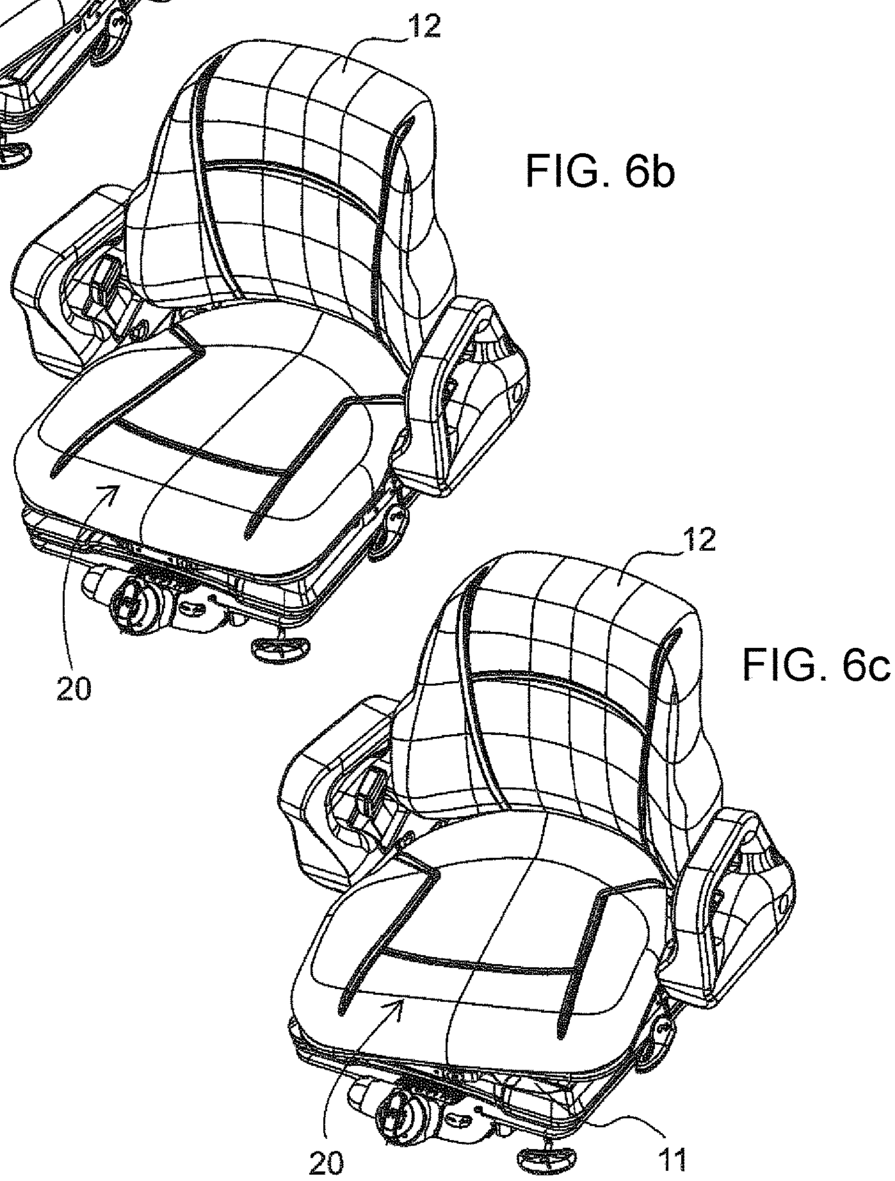
FIG. 6b
FIG. 6c

IN-CUSHION SEAT SWIVEL

BACKGROUND OF THE INVENTION

The present disclosure relates generally to a swivel seat for a vehicle.

Conventionally, some types of vehicles employ swivel seats or rotatable seats that are pivotable or rotatable generally about a central, vertical pivot axis. Such multi-positionable seats find particular utility in farm and industrial vehicles, for example. Pivotable seats are especially useful for a tractor equipped with a backhoe, typically rear-mounted and conventionally requiring a backward-facing seat to facilitate operation of the hoe. Pivotable seats are also of significant value for an industrial truck used in a manufacturing or warehouse setting, such as a forklift or pallet truck. In each of these examples, the vehicle operator frequently needs to look rearward while driving the vehicle in reverse. For a standard non-pivotable seat, the range of motion of the operator is limited to the operator's spinal flexibility, but even for the most limber driver the range of rearward vision is severely limited. In the case of the fixed seat, the vehicle operator must lift his/her weight off the seat in order to increase the angular range of motion for a full rearward view. This maneuver compromises the operator's ability to control the vehicle.

The swivel or pivotable seat greatly increases the range or movement of the vehicle operator so that there are virtually no rearward blind spots. The swivel seat achieves this wide range of motion without forcing excessive spine rotation by the operator, and instead allowing the operator to keep his/her spine in a normal alignment while driving in reverse. Thus, the swivel seat not only facilitates rotating for a better rearward view, it encourages this movement since the vehicle operator can perform the rotation without discomfort. The swivel seat thus improves vehicle safety by ensuring that the vehicle operator has a full view of the rearward path of the vehicle, without sacrificing the operator's control of the vehicle.

Devices exist that are adjuncts to the standard seat on the farm and industrial vehicles mentioned above. The adjuncts are in the form of a rotating disc that provides a favorable angular range of motion, often up to 25° left or right rotation. However, the adjunct sits on the existing seat cushion thereby depriving the vehicle operator of the comfort of the existing seat. The adjunct swivel also increases the effective height of the seat which can compromise the operator's ability to drive the vehicle.

SUMMARY OF THE DISCLOSURE

A pivoting seat for a vehicle comprises a seat frame mountable to the vehicle, the seat frame including a pivot mount and a plurality of roller assemblies. A seat cushion assembly includes a seat cushion and a seat pan assembly supporting the seat cushion that is pivotably mounted to the pivot mount so that the seat cushion assembly is pivotable relative to the seat frame. The seat pan assembly includes a flat perimeter plate at an outer perimeter of the seat pan assembly, wherein each of the plurality of roller assemblies is arranged to contact the flat perimeter plate to support the seat cushion assembly while permitting pivoting of the seat cushion assembly relative to the seat frame.

DESCRIPTION OF THE DRAWINGS

FIGS. 6*a*-6*c* are top perspective views of the seat shown in FIGS. 1-2, the seat cushion assembly shown in three positions.

DETAILED DESCRIPTION

Figure 1:
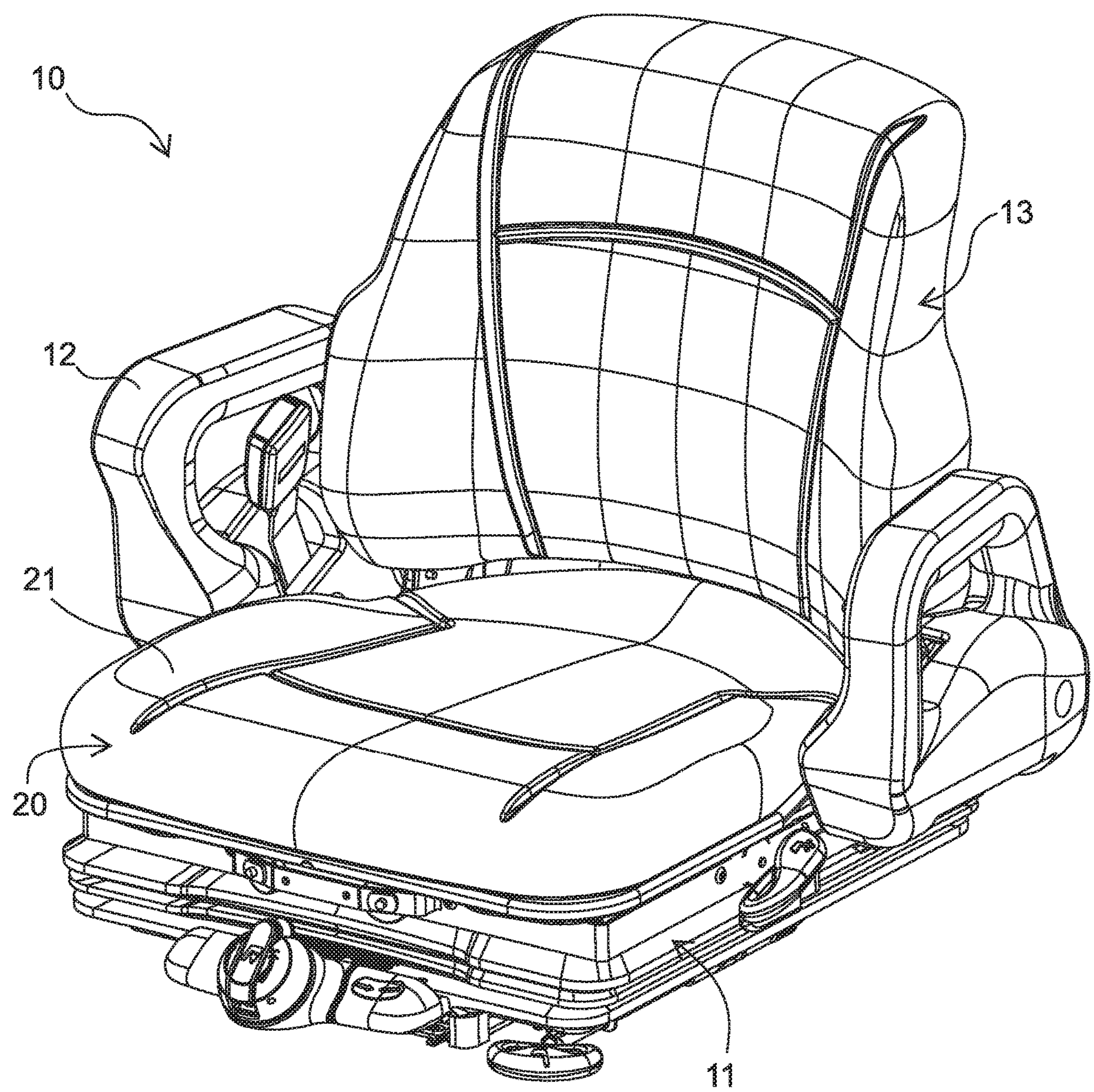
FIG. 1 is a perspective view of a seat including a pivoting seat cushion assembly according to the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

A vehicle seat 10, shown in FIG. 1, includes an adjustable base 11 that is configured and adapted to be mounted to a vehicle in a conventional manner. The base 11 can include adjustments for forward-backward movement, height and tilt, for example, and can incorporate other movements or controls as needed. The base 11 can also provide an anchor point for the vehicle seat belt. Arms 12 may be mounted to the seat base in a conventional manner and may be fixed or moveable. Likewise, the seat back 13 is supported by the seat base 11 in a conventional manner and may be fixed or moveable. The seat 10 further includes a seat cushion assembly 20 mounted to the seat base 11 in a conventional manner, in which the assembly includes a seat cushion 21 upon which the vehicle operator is seated.

Figure 2:
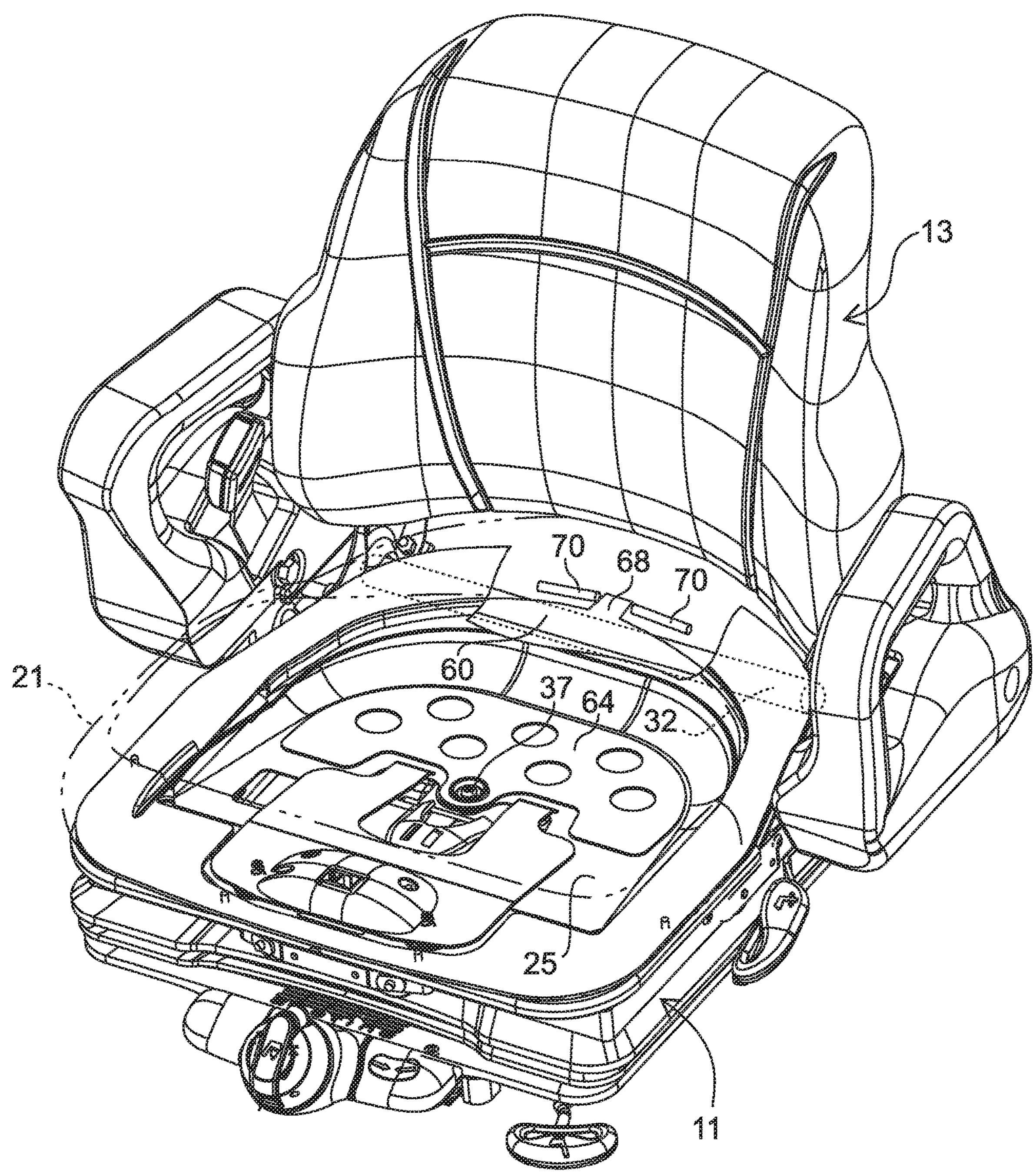
FIG. 2 is a perspective view of the seat shown in FIG. 1, with the seat cushion shown in phantom to expose the seat pan.
Figure 3:
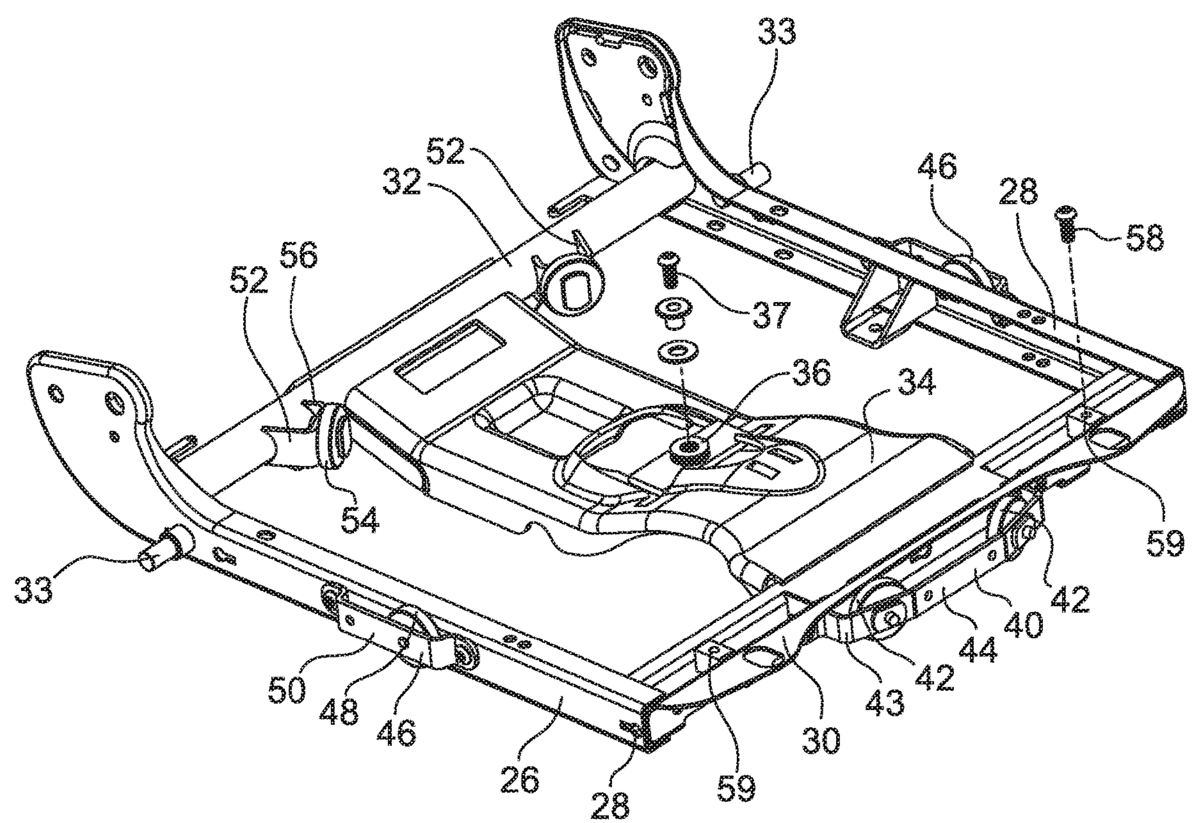
FIG. 3 is a perspective view of the seat frame for the seat shown in FIGS. 1-2.

According to this disclosure and as shown in FIG. 2, the seat cushion assembly 20 is configured to permit side-to-side pivoting the seat cushion 21 when the vehicle operator is seated and even seat-belted. The assembly 20 includes a seat pan 25 that is mounted to a seat frame 26 by a pivot fastener 37. As described herein, the pivot fastener 37 holds the seat pan to the seat frame while permitting the seat pan to pivot relative to the frame. Details of the seat frame 25 are shown in FIG. 3. The frame 25 includes side rails 28, a front beam 30 connected between the side rails, and a rear cross bar 32 connected between the side rails, altogether forming a generally rectangular support structure. The seat frame 25 is supported on the seat base 11 in a known manner and may include side posts 33 projecting from the side rails 26 to permit forward and backward sliding movement of the seat pan relative to the seat base. The seat frame 25 further includes a center beam 34 extending between the front beam 30 and rear cross bar 32. The center beam stiffens the seat frame and incorporates a pivot mount 36 for receiving the pivot fastener 37. The pivot fastener 37 may be a screw that is threaded into a threaded opening at the pivot mount 36 or may a bolt or other similar fastener capable of holding the seat pan to the frame while permitting relative pivoting of the seat pan. The pivot fastener 37 may include a bushing or similar component to achieve a low friction pivoting movement of the seat pan.

In one aspect of the seat cushion assembly 20 of the present disclosure, the seat frame includes a plurality of rollers configured to support the seat pan 25. In one embodiment, the seat frame 25 includes a front roller assembly 40 that includes two rollers mounted to the front beam 30 of the frame by a mounting bracket 44. The mounting bracket supports an axle 43 of each roller, with the axle and corresponding roller configured to permit free rotation of the roller 42. The rollers may be formed of a strong, resilient material, such as a polyurethane plastic, nylon plastic or a rubber material. The roller material must be capable of supporting the weight of vehicle operator, distributed among all of the plurality of rollers, without significant deformation and while retaining the ability to rotate smoothly.

The seat frame further includes a roller assembly 46 on each side rail 28, each including a roller 48 rotatably mounted to the side rail by a mounting bracket 50. A pair of rear roller assemblies 52 are mounted to the rear cross bar 32. In these assemblies, a roller 54 extends from a mounting bracket 56. In the illustrated embodiment, each mounting bracket 56 is aligned to face slightly inward toward the center beam 34 based on the configuration of portion of the seat pan 25 contacting the rollers 54, as discussed herein. However, the rollers 54 can be aligned in different orientations to accommodate other configurations of seat pans. Moreover, the two separate rollers 54 may be supported by a common mounting bracket, such as in the front roller assembly 40. It can be further appreciated that each of the roller assemblies 40, 46, 52 can include one or more rollers 42, 48, 54 as needed to adequately support the seat pan 25 and the weight of the operator seated on the seat 10. In the illustrated embodiment, six rollers 42, 48, 54 are provided that can share in supporting the weight of the seat pan and operator while still permitting smooth rotating characteristics.

The rollers of the roller assemblies described above are arranged and configured to engage a surface of the seat pan 25. In particular, the roller assemblies are located at a radial distance from the pivot mount 36 and are angularly dispersed around a circumference at the radial distance. More specifically, the roller assemblies are dispersed to provide a uniform support for the seat pan, meaning that roller assemblies are provided at the front, rear and sides of the seat pan. The rollers of the roller assemblies may be located on the same circumference, or may be on different circumferences (i.e., different radial distances from the pivot mount), depending on the configuration of the seat pan.

Figure 4:
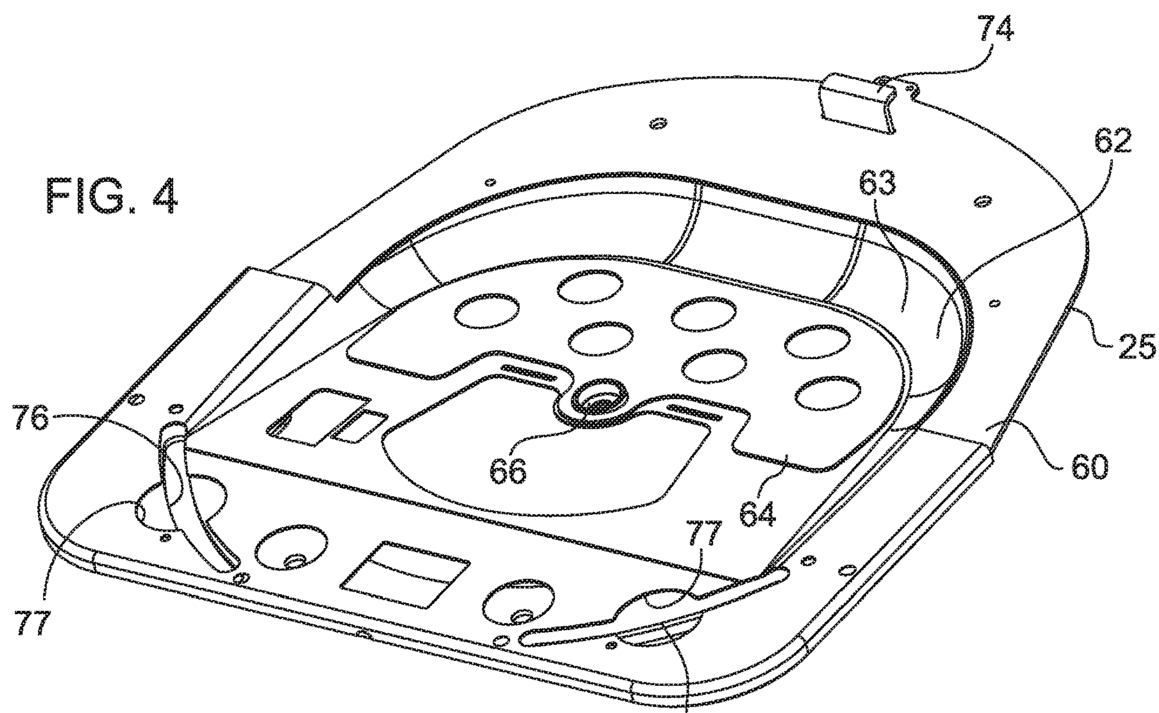
FIG. 4 is a top perspective view of the seat pan for the seat shown in FIGS. 1-2.
Figure 5:
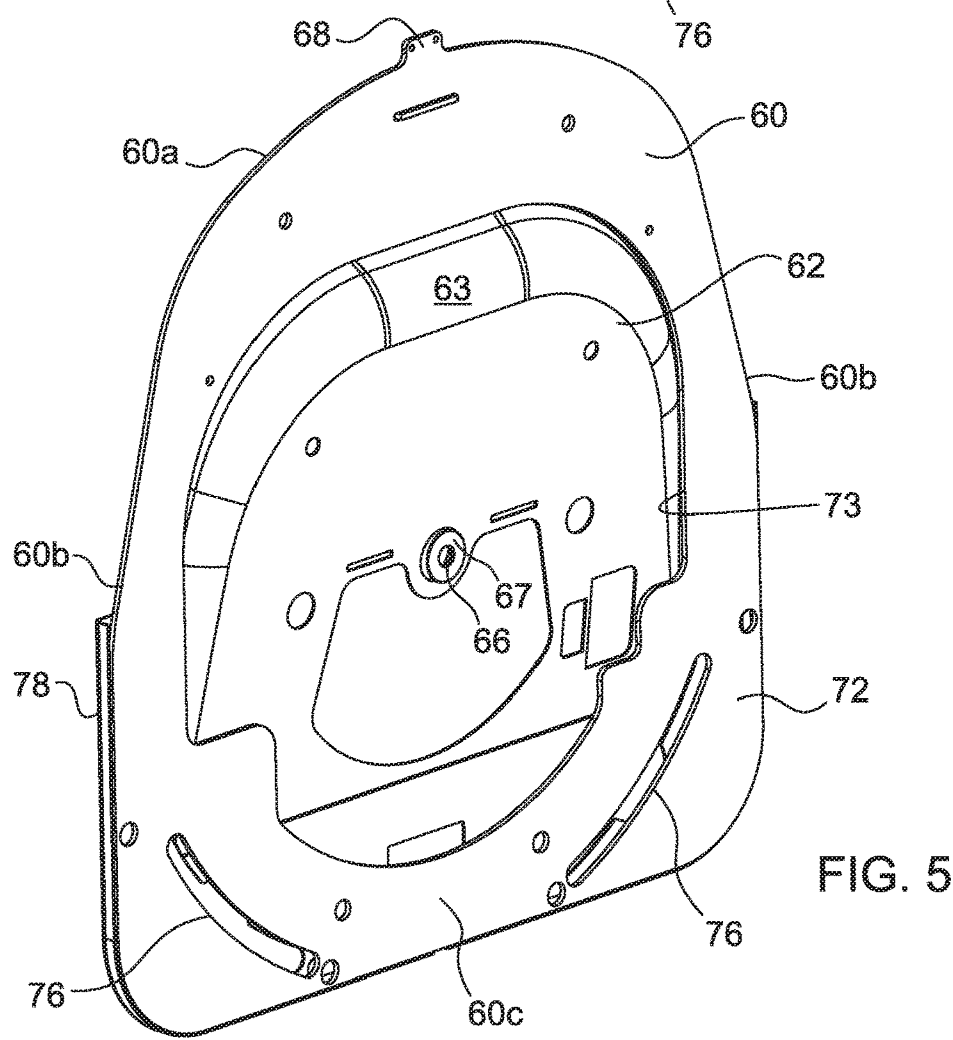
FIG. 5 is a bottom perspective view of the seat pan for the seat shown in FIGS. 1-2.

In one embodiment, the seat pan 25 is a multi-piece component that includes a flat perimeter plate 60 that receives and supports a contoured pan 62, as shown in FIGS. 4-5. A reinforcement plate 64 is fastened to the contoured pan 62 to provide additional strength to the seat pan 25. The reinforcement plate overlaps at least a rear portion of the pan 62 and the center pivot mount 66, as shown in FIG. 4. As shown in FIG. 2, the center pivot mount 66 is aligned with the pivot mount 36 of the seat frame 26 and is configured to receive the pivot fastener 37. As depicted in FIG. 2, the head of the pivot fastener 37 may be nested within a countersink in the reinforcement plate 64. As shown in FIG. 5, the contoured pan 62 may include a washer or bushing 67 configured for low friction contact with the pivot mount 36 of the seat frame center beam 30. Although it is contemplated that the weight of the seat pan 25 and its occupant will be primarily supported by the roller assemblies 42, 48, 54, the center portion of the contoured pan 62 may also contact the pivot mount. Thus, the washer 67 facilitates smooth rotation of the pan 62 on the pivot mount 36.

The flat perimeter plate 60 has a flat surface 72 facing the rollers 42, 48, 54 to provide a smooth rolling surface for the rollers and for the plate as it pivots about the pivot fastener 37. The perimeter plate 60 positions the load-bearing surface of the seat pan 25 at the perimeter of the seat pan which permits an advantageous weight distribution among the rollers while maintain the pivot mechanism of the seat cushion assembly 20 within the envelop of the seat pan. Moreover, the combination of the perimeter rollers and the flat perimeter plate maintains the height of the seat cushion assembly to the height of a fixed seat cushion. In other words, the pivot mechanism disclosed herein does not increase the height of the seat so that the pivot mechanism avoids the problems associated with the prior art pivot devices. In the illustrated embodiment, the perimeter plate 60 has a generally circular front region 60*a* corresponding to the location of the front roller assembly 40, generally linear side regions 60*b* corresponding to the side roller assemblies 46 and a generally widened circular region 60*c* corresponding to the rear roller assemblies 52. The three regions 60*a*, 60*b*, 60*c* are located at the outer perimeter of the seat pan assembly 25 to optimize the load carrying and free rotation capability of the seat pan assembly. The rollers 42 of the front roller assembly contact the front region 60*a* at one radius from the pivot mount 36, while the side and rear rollers 48, 54 contact the respective side and rear regions 60*b*, 60*c* at a greater radius. Nevertheless, the respective regions of the perimeter plate 60 are sized so that the rollers maintain contact with the surface 72 throughout the entire range of motion of the seat cushion assembly 20.

The perimeter plate 60 defines a large central opening 73 that receives the contoured portion 63 of the pan, as shown in FIG. 5. The plate 60 may include a clip 74 that engages the rear edge of the contoured pan 62. The perimeter plate is generally co-extensive with the contoured plate, as shown in FIG. 5 and nestles within an outer wall or rim 78 of the contoured pan 62 to help lock the perimeter plate 60 and contoured pan 62 together. The rim 78 can extend from one side, across the front edge of the pan and to the other side of the pan. The perimeter plate and contoured pan may be fastened together using conventional fasteners, such as screws. Likewise, the reinforcement plate 64 may be fastened to the contoured pan 62 by conventional fasteners, such as screws.

The perimeter plate further defines arcuate slots 76 at opposite sides at the front of the plate, as shown in FIGS. 4-5. The slots are defined at a fixed radius from the pivot mount 66. The slots receive limit screws 58 that are threaded into corresponding bores 59 in the front beam 30 of the seat frame 26, as shown in FIG. 3. The limit screws extend through the slots 76, and through associated openings 77 in the contoured pan 62, and are anchored to the seat frame at the bores 59. The limit screws 58 ride within the arcuate slots as the seat pan 25 pivots relative to the seat frame, and contact the ends of the respective slots 76 or the respective openings 77 to prevent further pivoting or rotation of the seat pan. It is understood that a single arcuate slot may be provided with a single limit elements or screws, with the single slot sized to provide the same limited range of pivoting.

The flat perimeter plate 60 includes a rearward projecting tang 68 (FIG. 5) that is fastened to a pair of opposing springs 70, as shown in FIG. 2. The springs apply a centering force as the seat pan 25 pivots left or right away from the neutral position shown in FIG. 2. The springs are anchored to the seat frame, such as to the rear cross bar 32. In one embodiment, the springs are extension springs that stretch from their initial position. The spring constant is sufficient to assist the operator in returning the seat cushion assembly to its centered position, but is not so great that the operator is unable to overcome the spring force to pivot the seat cushion assembly. Other spring elements are contemplated, including a single spring that is configured to exert a restoring force on the tang 68 for any direction of pivoting of the seat cushion assembly. In addition to the spring, or in lieu of the spring, the seat frame and seat pan 25 can incorporate a detent arrangement in which the seat pan is centered between detents in the baseline position, but the detents can be easily traversed upon rotation of the seat pan.

In one embodiment, the seat cushion assembly 20 disclosed herein is capable of pivoting 30° in either direction from the centered position. As seen in FIGS. 6*a*-6*c*, the seat cushion assembly 20 pivots independent of the seat back 12 and the seat base 11. This range of motion allows the vehicle operator to turn either direction to view the rear of the vehicle, thereby providing the operator with essentially a full panoramic view. This range of motion allows the vehicle operator to look backward without having to distort his/her spine and while maintaining complete command of the vehicle controls.

The contoured pan 62 can be formed of a rigid plastic, such as ABS plastic. The perimeter plate 60 and reinforcement plate 64 may be formed of a metal, such as stainless steel. The metal plates can have a thickness of 1-2 mm. The composite formed by fastening the three components together provide a seat pan 25 that is strong and rigid enough to withstand the expected loads associated with the seat 10.

Figure 7:
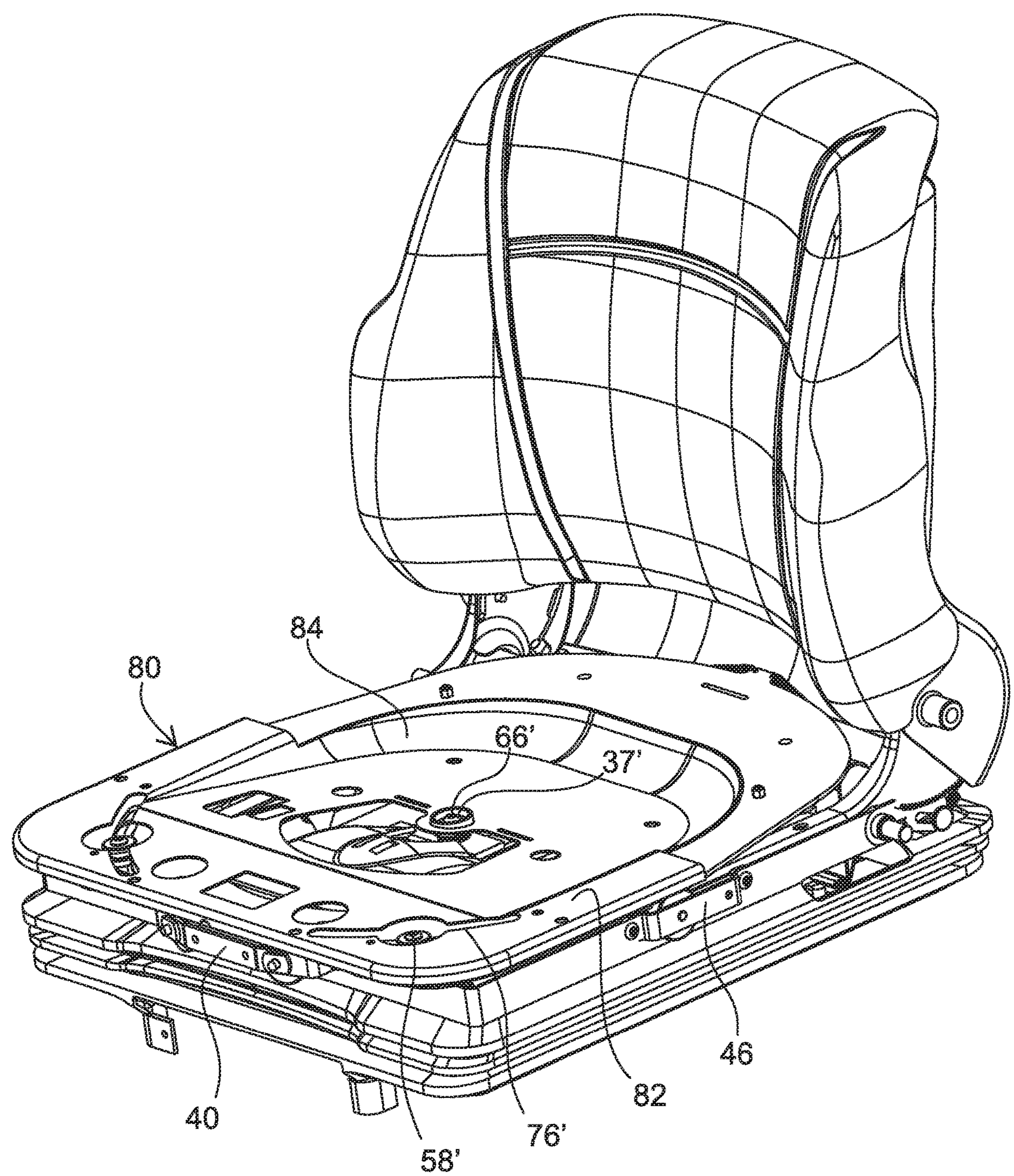
FIG. 7 is a perspective view of an alternative seat pan supported on a seat base of the seat shown in FIGS. 1-2.

In the embodiment illustrated in FIGS. 2-5, the seat pan 25 is a multi-piece component with a flat perimeter plate 60 and reinforcement plate 64 that are separate from, but fastened to, the contoured pan 62. In an alternative embodiment, shown in FIG. 7, the seat pan 80 is a one-piece construction. The flat perimeter plate is embodied in a flat perimeter 82 of the one-piece pan. The pivot screw 37' is received within a center pivot mount 66' that is integral with the contoured pan portion 84. In one embodiment, the one-piece pan 80 can be formed of stainless steel with a thickness of about 3 mm. to provided strength and rigidity suited for the expected use of the seat 10. As with the seat pan 25, the seat pan 80 rests on the roller assemblies 40, 46, 52, and in particular with the rollers contacting the flat perimeter portion 82 of the seat pan. The arcuate limit slots 76' are incorporated into the seat pan to receive the limit stops 58', as with the seat pan 25.

The present disclosure should be considered as illustrative and not restrictive in character. It is understood that only certain embodiments have been presented and that all changes, modifications and further applications that come within the spirit of the disclosure are desired to be protected.

What is claimed is:

1. A pivoting seat for a vehicle comprising:

a seat frame mountable to the vehicle, the seat frame including a seat base, wherein the seat base comprises a pivot mount and a plurality of roller assemblies, and a seat back connected to the seat base; and a seat cushion assembly including;

a seat cushion; and a seat pan assembly supporting the seat cushion and pivotably mounted to said pivot mount so that said seat cushion assembly is pivotable relative to said seat frame, the seat pan assembly including a flat perimeter plate at an outer perimeter of the seat pan assembly, wherein said seat pan assembly includes a contoured seat pan including a center pivot mount and a pivot connector connecting said contoured seat pan to said pivot mount of said seat frame at said center pivot mount of said seat pan; further wherein said contoured seat pan and said flat perimeter plate are separate and are fastened together; yet further wherein said contoured pan includes a contoured portion and said flat perimeter plate defines an opening configured to receive said contoured portion therethrough; still further wherein each of the plurality of roller assemblies is arranged to contact said flat perimeter plate to support the seat cushion assembly while permitting pivoting of said seat cushion assembly relative to said seat frame.

2. The pivoting seat of claim 1, wherein said contoured seat pan is formed of a plastic and said flat perimeter plate is formed of metal.

3. The pivoting seat of claim 2, wherein:

said perimeter plate is generally coextensive with said contoured pan; and said contoured pan includes an outer rim extending along a portion of opposite sides of said pan and along a forward edge of said pan, wherein said perimeter plate is nested within said outer rim.

4. The pivoting seat of claim 1, wherein said seat pan assembly further includes a reinforcement plate separate from said contoured seat pan and said flat perimeter plate, said reinforcement plate fastened to said contoured seat pan.

5. The pivoting seat of claim 4, wherein said reinforcement plate overlaps the center pivot mount of said contoured seat pan.

6. The pivoting seat of claim 5, wherein said contoured seat pan is formed of a plastic and said flat perimeter plate and said reinforcement plate are formed of metal.

7. The pivoting seat of claim 1, wherein:

said flat perimeter plate includes a tang extending therefrom; and said seat cushion assembly includes at least one spring element connected between said tang and said seat frame, said spring element configured to exert a restoring force on said tang to restore the seat cushion assembly to an initial position after a pivoting movement.

8. The pivoting seat of claim 1, wherein said roller assemblies each include one or more rollers pivotably supported by a bracket mounted to the seat frame.

9. The pivoting seat of claim 8, wherein the rollers are formed of a polyurethane plastic, a nylon plastic or a rubber material.

10. The pivoting seat of claim 1, wherein:

said flat perimeter plate defines at least one arcuate slot, said arcuate slot defined at a constant radius from said pivot mount; and said seat frame includes a limit element extending from said seat frame through said slot and configured to limit the range of movement of the flat perimeter plate, and therefore the seat cushion assembly, relative to the seat frame.

11. The pivoting seat of claim 10, wherein:

said perimeter plate is generally coextensive with said contoured pan; and said contoured pan defines at least one opening corresponding to said at least one arcuate slot in said perimeter plate, wherein said limit element extends through said at least one opening.

12. The pivoting seat of claim 1, wherein the seat frame includes:

a front beam;

a rear cross bar;

opposite side beams connected to said front beam and said rear cross bar; and a center beam connected to said front beam and said rear cross bar between said opposite side beams, wherein said center beam includes said pivot mount, and wherein said front beam, rear cross bar and opposite side beams each include a roller assembly.

13. The pivoting seat of claim 12, wherein:

said roller assemblies each include one or more rollers pivotably supported by a bracket mounted to the seat frame;

said front beam includes one roller assembly that includes two rollers;

said side beams each include one roller assembly that includes one roller; and said rear cross bar includes two roller assemblies, each including one roller.

* * * * *